(12) United States Patent
Boros (10) Patent No.: US 6,915,438 B2
(45) Date of Patent: Jul. 5, 2005

(54) DISTRIBUTED POWER MANAGEMENT METHOD FOR MONITORING CONTROL/ STATUS SIGNAL OF SUB-MODULES TO MANAGE POWER OF SUB-MODULES BY ACTIVATING CLOCK SIGNAL DURING OPERATION OF SUB-MODULES

(75) Inventor: Tibor Boros, San Francisco, CA (US)

(73) Assignee: Arraycomm, INC, San Jose, CA (US)

( * ) Notice: Subject to any disclaimer, the term of this patent is extended or adjusted under 35 U.S.C. 154(b) by 136 days.

(21) Appl. No.: 10/406,852

(22) Filed: Apr. 4, 2003

(65) Prior Publication Data

US 2004/0199796 A1 Oct. 7, 2004

(51) Int. Cl.[7] .............................. G06F 1/32; G06F 1/26
(52) U.S. Cl. ...................... 713/322; 713/300; 713/600
(58) Field of Search ................................ 713/600, 300, 713/320, 322; 709/202

(56) References Cited

U.S. PATENT DOCUMENTS

| | | | | |
|---|---|---|---|---|
| 5,585,745 A | * | 12/1996 | Simmons et al. | 326/93 |
| 5,592,173 A | * | 1/1997 | Lau et al. | 342/357.12 |
| 5,784,627 A | * | 7/1998 | MacDonald | 713/300 |
| 5,949,974 A | * | 9/1999 | Ewing et al. | 709/202 |
| 5,961,604 A | * | 10/1999 | Anderson et al. | 709/229 |
| 5,996,083 A | * | 11/1999 | Gupta et al. | 713/322 |
| 6,301,133 B1 | * | 10/2001 | Cuadra et al. | 363/65 |
| 6,448,672 B1 | * | 9/2002 | Voegeli et al. | 307/52 |
| 6,535,982 B1 | * | 3/2003 | Kawabe et al. | 713/300 |
| 6,647,502 B1 | * | 11/2003 | Ohmori | 713/322 |
| 6,711,613 B1 | * | 3/2004 | Ewing et al. | 709/223 |
| 6,711,691 B1 | * | 3/2004 | Howard et al. | 713/300 |
| 6,721,672 B2 | * | 4/2004 | Spitaels et al. | 702/62 |
| 6,735,704 B1 | * | 5/2004 | Butka et al. | 713/300 |
| 6,774,838 B2 | * | 8/2004 | Sun | 342/357.06 |
| 2002/0026598 A1 | * | 2/2002 | Osborn | 713/323 |

OTHER PUBLICATIONS

Copy of PCT Search Report dated Jan. 6, 2005.

* cited by examiner

*Primary Examiner*—Chun Cao
(74) *Attorney, Agent, or Firm*—Blakely Sokoloff Taylor & Zafman LLP (57) ABSTRACT

According to an embodiment of the invention, a method and apparatus are described for distributed power management. According to an embodiment of the invention, a method comprises monitoring one or more signals relating to the operation of each of a plurality of sub-modules; and managing power independently for each sub-module based on the monitored signals.

48 Claims, 8 Drawing Sheets

DISTRIBUTED POWER MANAGEMENT METHOD FOR MONITORING CONTROL/ STATUS SIGNAL OF SUB-MODULES TO MANAGE POWER OF SUB-MODULES BY ACTIVATING CLOCK SIGNAL DURING OPERATION OF SUB-MODULES

FIELD OF THE INVENTION

The invention relates generally to the field of electronics. More particularly, the invention relates to distributed power management.

DESCRIPTION OF THE RELATED ART

In certain technologies, including signal processing in telecommunications, operations are performed by sub-modules that may operate largely independently using an autonomous control unit. In such technology, each sub-module generally waits for an external signal, such as a START signal or ENABLE signal, to initiate processing. The sub-modules then process the input data, and may produce a status signal, such as a DONE signal produced by the sub-module, to indicate the processing is finished. In some examples a sub-module may generate a VALID signal when the first few samples of the output data are ready for processing, which is important when the operation of the subsequent sub-module is started in a pipelined manner.

Power management in technologies such as telecommunication can be extremely important issue because power availability, such as available battery life in a portable device, may be limited. Power management in a conventional system may be implemented through clock gating, clock speed reduction, power supply cut-off, or other method that is appropriate for the technology involved. For example, a sub-module using CMOS (complementary metal oxide semiconductor) technology generally consumes negligible power whenever the clock of the sub-module is gated (disabled). A power management unit (PMU) may be added to the system to provide clock signals to each of the sub-modules. The PMU may interface with an external entity, such as a microprocessor or micro-controller. The external entity can then write to a power management register to provide for power management operation, such as enabling or disabling clock signals for the sub-modules.

However, conventional methods of power management allow for only limited power management. In a system in which clock gating is utilized for power management, many sub-modules may utilize a common clock. In one example, all sub-modules of a receiver chain may utilize a common receiver clock, and all sub-modules of a transmitter chain may utilize a common transmitter clock. In such an example, a PMU register would include two elements, providing for a receiver ENABLE signal and a transmitter ENABLE signal. An external entity may be capable of enabling and disabling the entire transmitter chain or the entire receiver chain, but this can be very inefficient, especially when the sub-modules operate sequentially. For example, the external entity may need to turn on a receive chain for the duration of the entire receive operation. However, due to the sequential nature of the processing, it is possible that only one sub-module may operate at a time, while all the rest of the sub-modules unnecessarily consume power.

Other methods of power management could allow for an external entity, such as a microprocessor or micro-controller, to manage power for each of the sub-modules as needed. However, the external entity would be required to expend significant efforts to determine when to enable or disable operation of each sub-module by monitoring signals that are related to operation of the sub-modules. Power management control by an external entity would thus be very inefficient and may overload the operation of the external entity.

BRIEF SUMMARY OF THE INVENTION

A method and apparatus are provided for distributed power management. According to an embodiment of the invention, a method comprises monitoring one or more signals relating to the operation of each of a plurality of sub-modules; and managing power independently for each sub-module based on the monitored signals.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements, and in which.

DETAILED DESCRIPTION OF THE INVENTION

Overview

An embodiment of the present invention provides for distributed power management in a system. According to the embodiment, each sub-module in the system has an associated power management unit (PMU). The PMU associated with a sub-module provides for power management for the sub-module.

For example, the clock signal for each sub-module in a system can be gated when the sub-module is inactive. The PMU can enable the clock signal for sub-module when the sub-module becomes active. When operation by the sub-module is completed, the PMU then disables the clock signal.

Power Management

The inefficiency of power management for a system that comprises sub-modules may be reduced by distributing power management functions and allowing more granularity in power control. Specifically, independent power management may be provided for each sub-module in the system.

According to one embodiment, independent clock control is provided for each of a plurality of sub-modules. In this example, an external entity may have the capability to turn on the clock for the sub-modules when they need to operate. However, the external entity may not operate in a real-time manner and may not be aware when certain sub-modules start and finish operation. It is also possible to make control and status signals (such as START, DONE, and VALID signals) visible to an external entity. However, constantly monitoring control and status signals may require a great deal of processing power and may become difficult or unfeasible, particularly if the number of sub-modules in a system is large.

Under an embodiment of the invention, a distributed power management method is provided such that a sub-module of a plurality of sub-modules can be activated independently from other sub-modules. In one example, the distributed power management method can provide that the clock signal for each sub-module is turned on only for the duration of a required operation, with the clock being gated at other times. Under such an embodiment, the power management system operates automatically such that no interaction is required from an external entity. Instead, the clock is enabled or disabled based upon detection of signals related to sub-module operation, such as control signals (which may include a START or ENABLE signal) or status signals (which may include a DONE signal produced by the sub-module).

In a particular embodiment, a power management system includes a plurality of power management units (PMUs), with one PMU associated with each sub-module. In another embodiment of the invention, the functions of a power management unit may be included within a sub-module, or are otherwise incorporated into the system. Each PMU provides for power management for the associated sub-module.

In another embodiment, a power management system may include a power management unit master (PMU master) and a plurality of power management unit slaves (PMU slaves), with one PMU slave associated with each sub-module. In this embodiment, each PMU slave can send a signal to the PMU master, which then operates to enable or disable the associated sub-module. For example, a PMU slave may send a clock enable signal to the PMU master, thereby resulting in the PMU master providing a clock signal to the associated sub-module. The use of a PMU master may provide advantages in certain embodiments because, for example, the PMU master can be responsible for proper timing and conditioning of clock signals provided to the sub-module without clock skew, rather than requiring each PMU slave to provide such clock signals.

Figure 1:
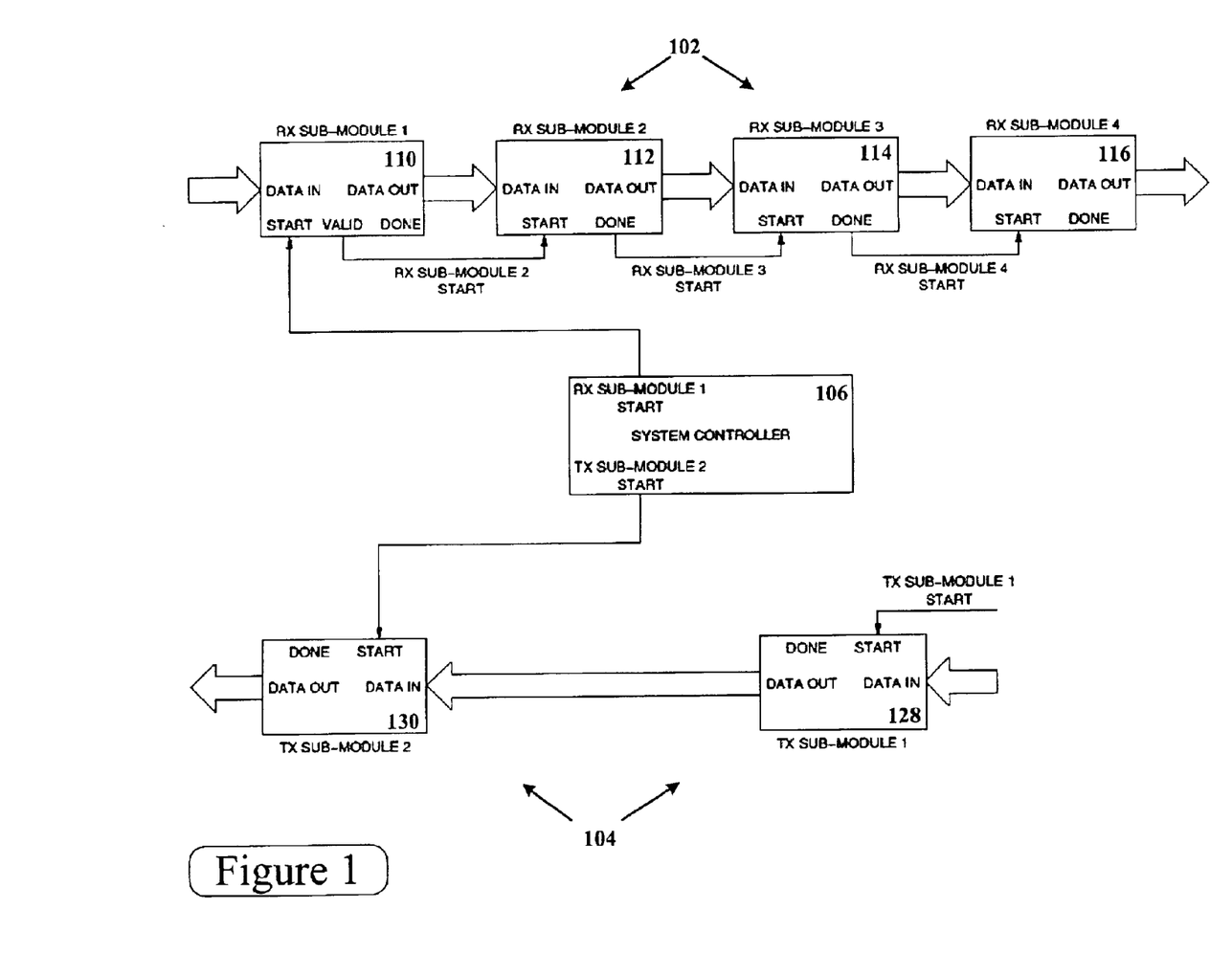
FIG. 1 is an illustration of an exemplary telecommunications system with which an embodiment of the invention may be utilized.

FIG. 1 is an illustration of an exemplary telecommunications system with which an embodiment of the invention may be utilized. In this illustration, the system includes a receiver chain of sub-modules 102 and a transmitter chain of sub-modules 104. A system controller 106 provides certain signals, such as RX sub-module 1 START signal and a TX sub-module 2 START signal. The sub-modules in each chain may operate sequentially or may overlap partially or completely in operation (pipelined or parallel processing). In the receiver chain 102, a receiver sub-module 1 110 commences operation upon receiving a start signal from the system controller 106. In another embodiment, a sub-module may receive an enable signal. When the first valid data is available but prior to completion of operation of receiver sub-module 1 110, a VALID signal is issued by receiver sub-module 1 110 and received as a START signal by a receiver sub-module 2 112. When receiver sub-module 2 112 completes processing of data, a DONE signal is issued and is received as a START signal by a receiver sub-module 3 114. When receiver sub-module 3 114 completes processing of data, a done signal is issued and is received as a start signal by receiver sub-module 4 116. For the transmitter chain 104, a transmitter sub-module 1 128 receives a start signal from an external entity, such as a master control unit (MCU), and then begins processing data. A transmitter sub-module 2 130 processes the data when a start signal is received from the system controller 106.

In the illustration shown in FIG. 1, power management for the chains of sub-modules, such as gating the clocks for all of the receiver chain 102 or for all of the transmitter chain 104, can be inefficient. For example, in the receiver chain 102 the clock for receiver sub-module 2 112 is not required until receiver sub-module 1 has provided valid data for processing. The clock signals for the receiver sub-module 3 114 and the receiver sub-module 4 116 are not required until the previous sub-modules in the chain have completed processing. Therefore, power may be wasted in activating sub-modules that are not currently operating.

Power Management System

Figure 2:
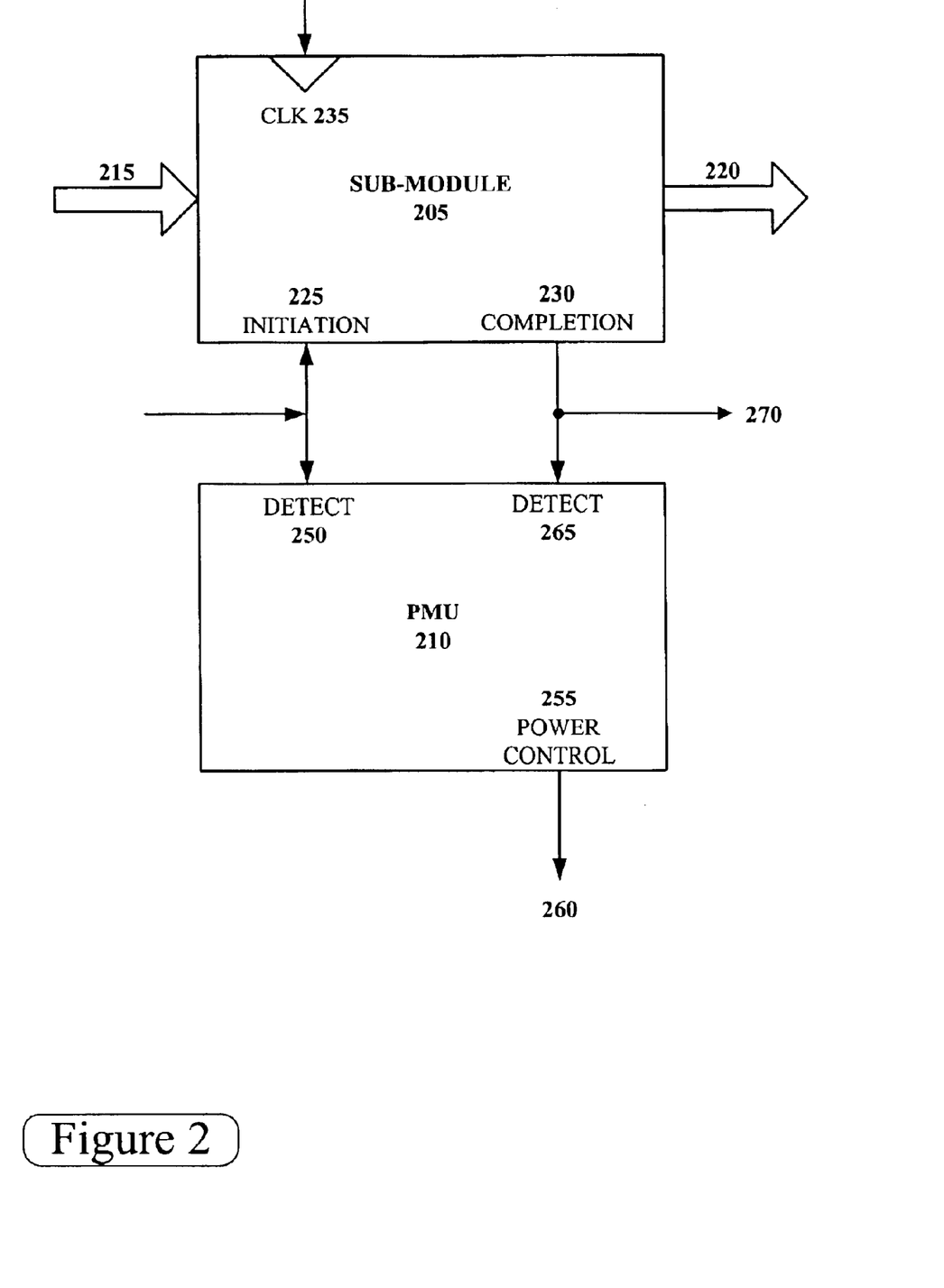
FIG. 2 illustrates an embodiment of a sub-module associated with a power management unit.

Under an embodiment of the invention, power management is improved by associating each sub-module with a power management unit for use in power control. FIG. 2 illustrates an embodiment of a sub-module 205 that is associated with a power management unit (PMU) 210. The sub-module 205 may receive data 215 from another unit, system, or sub-module and may transfer data 220 to another unit, system, or sub-module. The sub-module 205 may include an input 225 to receive an initiation signal (which may be referred to as a START signal or an ENABLE signal) to direct the sub-module to commence processing of data, and an output 230 to provide a completion signal (which may be referred to as a DONE signal) when processing of data is completed. A START pulse or signal will cause the sub-module to begin operation. In another embodiment, the sub-module may receive an enable input and may only operate while the enable signal is active. In certain examples, the sub-module may generate a VALID signal to indicate that the first valid data is available for processing by another sub-module. The sub-module 205 also includes a clock input 235 to receive a clock signal.

Coupled with the sub-module 205 is the PMU 210. In the illustrated embodiment, the PMU 210 includes a first DETECT input 250 to detect the initiation signal for the sub-module 205 that is provided by another unit, system, or sub-module 245. In another embodiment, a PMU may receive the initiation signal and then provide a delayed initiation signal to the sub-module, which may be useful if, for example, the sub-module requires an active clock signal before receiving a START signal. Upon detecting an initiation signal, the PMU 210 produces a power control signal 260 at an output 255 to enable operation of the sub-module 205. Under one embodiment, power management is performed by clock gating, and the power control signal 260 is a clock enable signal that directs that the clock signal 235 for the sub-module 205 be activated and deactivated as needed. Under another embodiment, power management is also performed using clock gating, and the power control signal 260 provided to the sub-module 205 is a clock signal that may be turned on or off by the PMU 210. Under another embodiment, power management is performed by varying clock speed, and power control signal 260 controls the clock speed applied to the sub-module 205. Under another embodiment, power management is performed by reducing or eliminating a power supply voltage applied to the sub-module 205, and power control signal 260 controls the supply voltage for the sub-module 205. The power control signal 260 may be used in conjunction with any power management method that is appropriate for the technology used in constructing the sub-module 205.

When the sub-module 205 has completed processing, the sub-module 205 produces a completion signal at the DONE output 230. The completion signal is detected by a second detector 265 of the PMU 210 and may also be transferred to another unit, system, or sub-module 270. Upon detecting a completion signal, the PMU 210 modifies or disables the power control signal 260 to return the sub-module 205 to a low power, inactive state.

Figure 3:
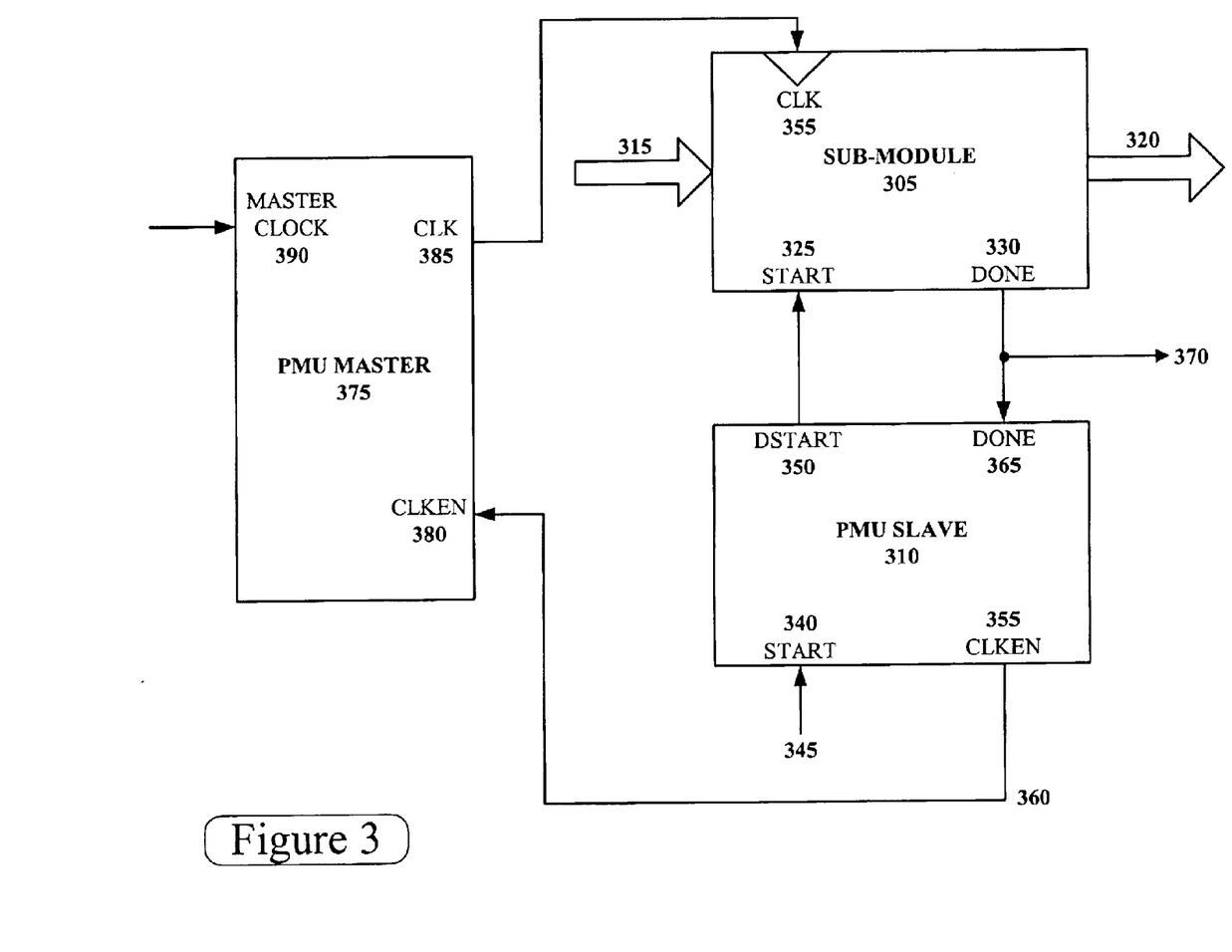
FIG. 3 illustrates an embodiment of a sub-module associated with a power management unit slave controlling clock operation for the sub-module.

FIG. 3 illustrates a specific embodiment of a sub-module with a power management unit slave (PMU slave) and a power management unit master (PMU master). In this embodiment, the role of the PMU slave is to monitor signals related to the operation of the sub-module and to generate a clock enable signal for power management. The role of the PMU master is to generate the clock signal for the sub-module. In this illustration, a sub-module 305 is associated with a PMU slave 310. The sub-module 305 receives data 315 from another unit, system, or sub-module and transfers data 320 to another unit, system, or sub-module. The sub-module 305 includes a START input 325 to receive an initiation signal to commence processing of data and a DONE output 330 to provide a completion signal when processing of data is completed. The sub-module 305 also includes a clock input 335 to receive a clock.

Coupled with the sub-module 305 is the PMU slave 310. The PMU slave 310 includes a START input 340 to receive a START signal for the sub-module 305 from another unit, system, or sub-module 345. Before the sub-module 305 begins operation, it does not receive a clock signal and as a result consumes very little power. When data is ready for the sub-module 305, an initiation signal is sent by another unit, system, or sub-module 345. Upon receiving an initiation signal at the START input 340, the PMU slave 310 produces a clock enable signal 360 on a clock enable output 355. The clock enable signal is provided to a PMU master 375 at a clock enable input 380. The PMU master 375 then provides a clock signal via a clock output 385 to the clock input 335 of the sub-module 305. The PMU slave 310 then provides a delayed START signal on the DSTART output 350 that is received at the START input 325 of the sub-module 305. Upon receiving the delayed START signal, the sub-module 305 processes the received data.

When the sub-module 305 has completed processing, the sub-module 305 produces a completion signal at the DONE output 330. The completion signal is detected at the DONE input 365 of the PMU slave 310. Upon detecting a completion signal, the PMU slave 310 deactivates the clock enable signal at the clock enable output 355, which causes the PMU master 375 to disable the clock signal at the clock input 355 of the sub-module 305 and thereby returns the sub-module 305 to a low power, inactive state. In other embodiments, the sub-module 305 may provide a VALID signal prior to completion of operation to indicate when the first valid data is available at the output of the sub-module 305. The DONE signal or VALID signal may be provided to another unit, system, or sub-module 370.

Figure 4:
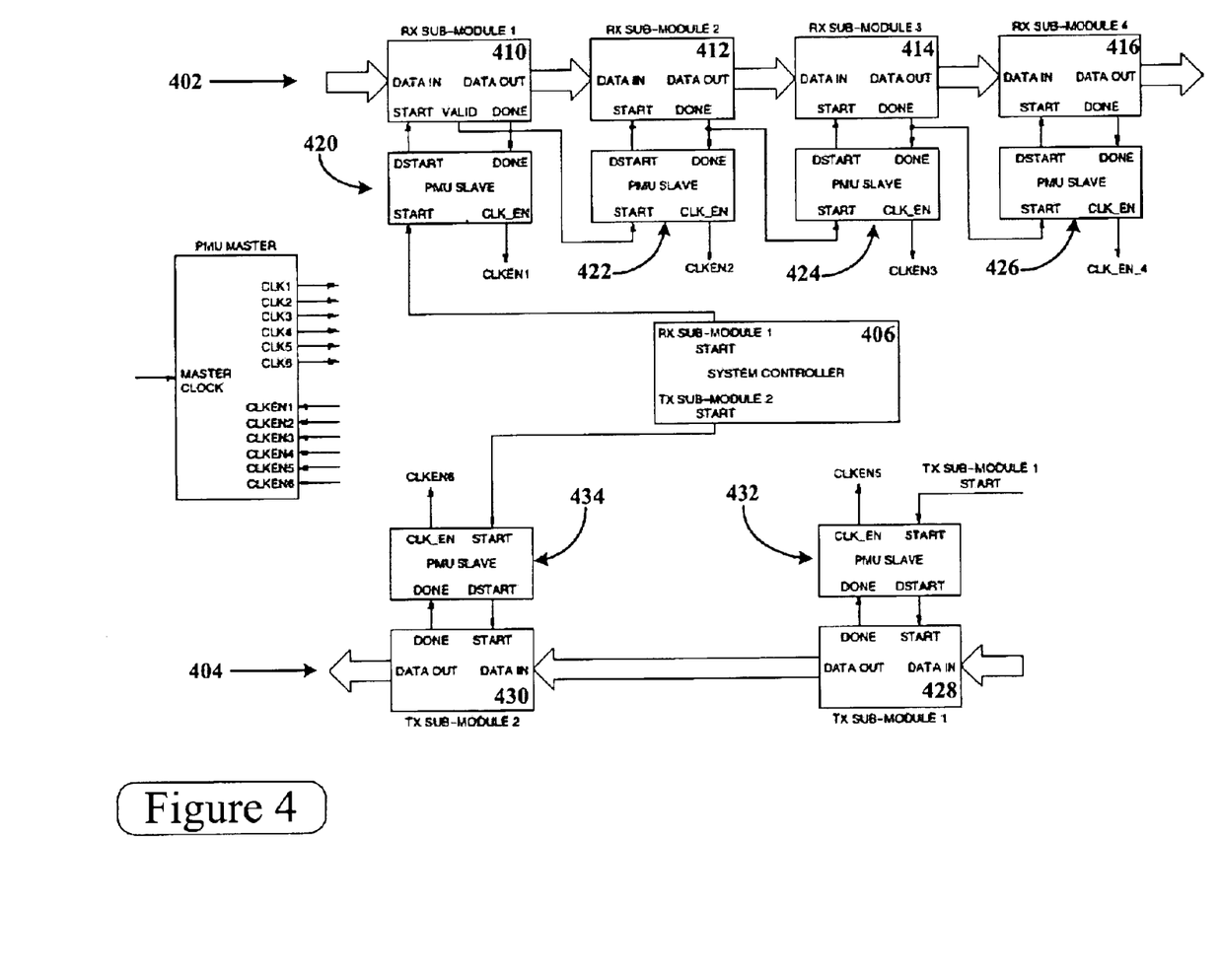
FIG. 4 illustrates an embodiment of a telecommunications system with a distributed power management system.

Under an embodiment of the invention, a power management system including a power management unit master (PMU master) and multiple power management unit slaves (PMU slaves) may be incorporated into a system, including, but not limited to, a telecommunications system. FIG. 4 illustrates an embodiment of a telecommunications system with a distributed power management system. In this illustration, the system includes a receiver chain of sub-modules 402 and a transmitter chain of sub-modules 404. A system controller 406 provides certain signals, such as a receiver START signal and a transmitter START signal. The sub-modules in each chain may operate sequentially or may overlap partially or completely in operation (pipelined or parallel processing). Each sub-module is associated with a PMU slave. In the receiver chain 402, a receiver sub-module 1 410 is associated with a first PMU slave 420. The system controller 406 provides a START signal that is received by the first PMU slave 420. Upon receiving the START signal, the first PMU slave provides a clock enable signal (CLKEN1) for receiver sub-module 1 410 to a power management unit master (PMU master) 408.

The PMU master 408 provides a clock signal at CLK1 for the receiver sub-module 1 410. The first PMU slave 420 provides a delayed start signal (DSTART) to the receiver sub-module 1 410, commencing data processing by the sub-module. When the first valid data is available but prior to completion of operation by receiver sub-module 1 410, a VALID signal is issued and received as a START signal for a second PMU slave 422, which is associated with a receiver sub-module 2 412. When receiver sub-module 1 410 has completed operation, it provides a DONE signal, which is detected by first PMU slave 420. First PMU slave 420 then deactivates the clock enable signal for receiver sub-module 1 410. Upon receiving the VALID signal, the second PMU slave 422 provides a clock enable signal (CLKEN2) and provides a delayed start signal to receiver sub-module 2 412. When receiver sub-module 2 412 has completed operation, it provides a DONE signal, which is detected by the second PMU slave 422. The second PMU slave 422 then deactivates the clock enable signal for the receiver sub-module 2 412. The processing then continues with a receiver sub-module 3 414, associated with a third PMU slave 424, and a receiver sub-module 4 416, associated with a fourth PMU slave 426. For the transmitter chain 404, a transmitter sub-module 1 428 is associated with a fifth PMU slave 432 and a transmitter sub-module 2 430 is associated with a sixth PMU slave 434.

Power Management Unit Slave and Master

Figure 5:
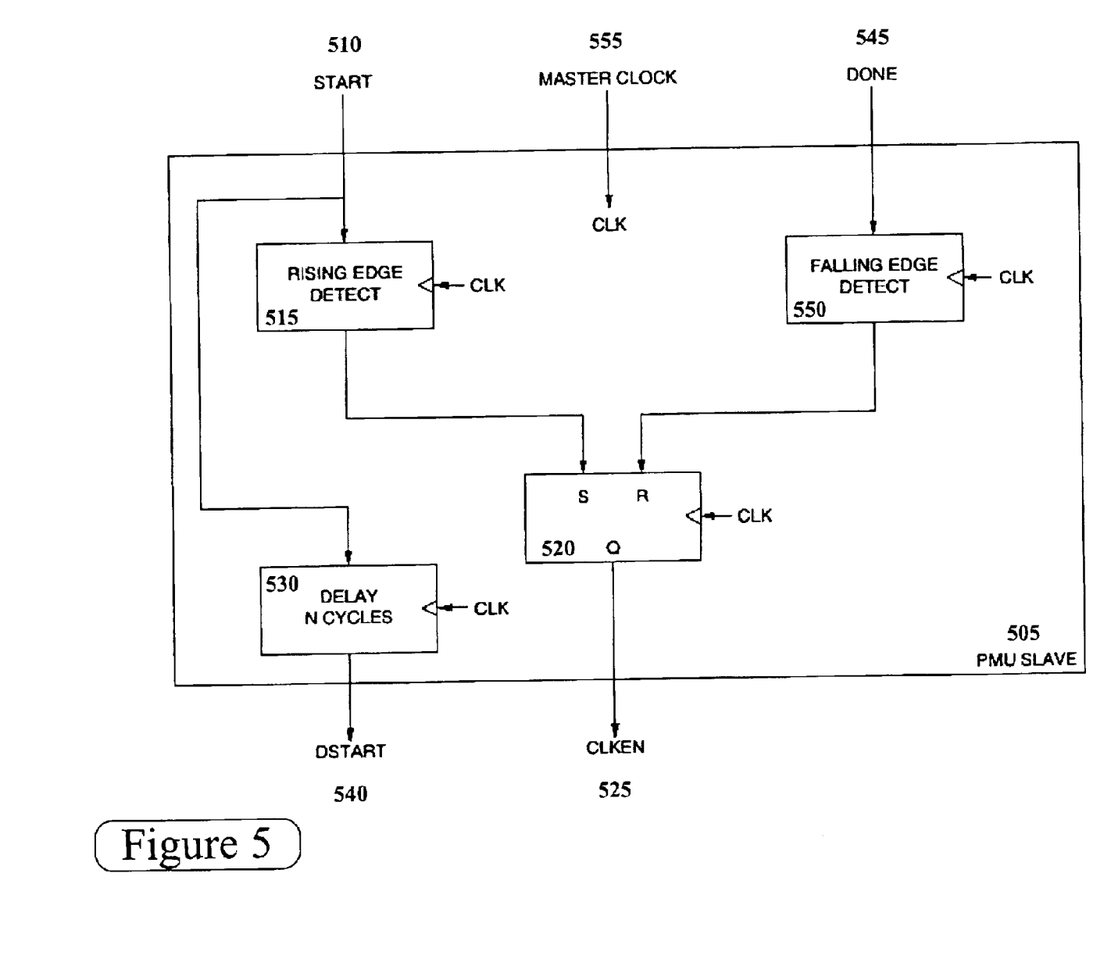
FIG. 5 illustrates an embodiment of a power management unit slave.

FIG. 5 illustrates an embodiment of a power management slave unit (PMU slave). In FIG. 5, a PMU slave 505 is associated with a sub-module that is not illustrated. The PMU slave 505 includes a START input 510, a clock enable output 525, a delayed START output 540, and a DONE input 545. The PMU slave 505 also includes a clock input 555, which provides for clock signals for the components of the power management slave unit 505. If a START signal is received by the PMU slave 505, a first detector 515 detects the signal on a leading (or rising) edge. Detection of the START signal results in setting the S line of a synchronous SR (set-reset) flip-flop 520, which results in setting an enable signal at the clock enable output 525. The START signal can be stored in a delay unit 530 that delays the START signal sufficiently to allow time for enabling a clock signal. The delayed START signal then appears at the DSTART output 540 of the PMU slave 505, which is provided to the associated sub-module. When the associated sub-module completes its operation, a DONE signal is made available to the DONE input 545. The trailing (or falling) edge of the signal is detected by a second detector 550. Detection of the DONE signal from the associated sub-module results in a reset signal to the synchronous SR flip-flop 520, which disables the clock enable signal on the enable output of the PMU slave 505.

Figure 6:
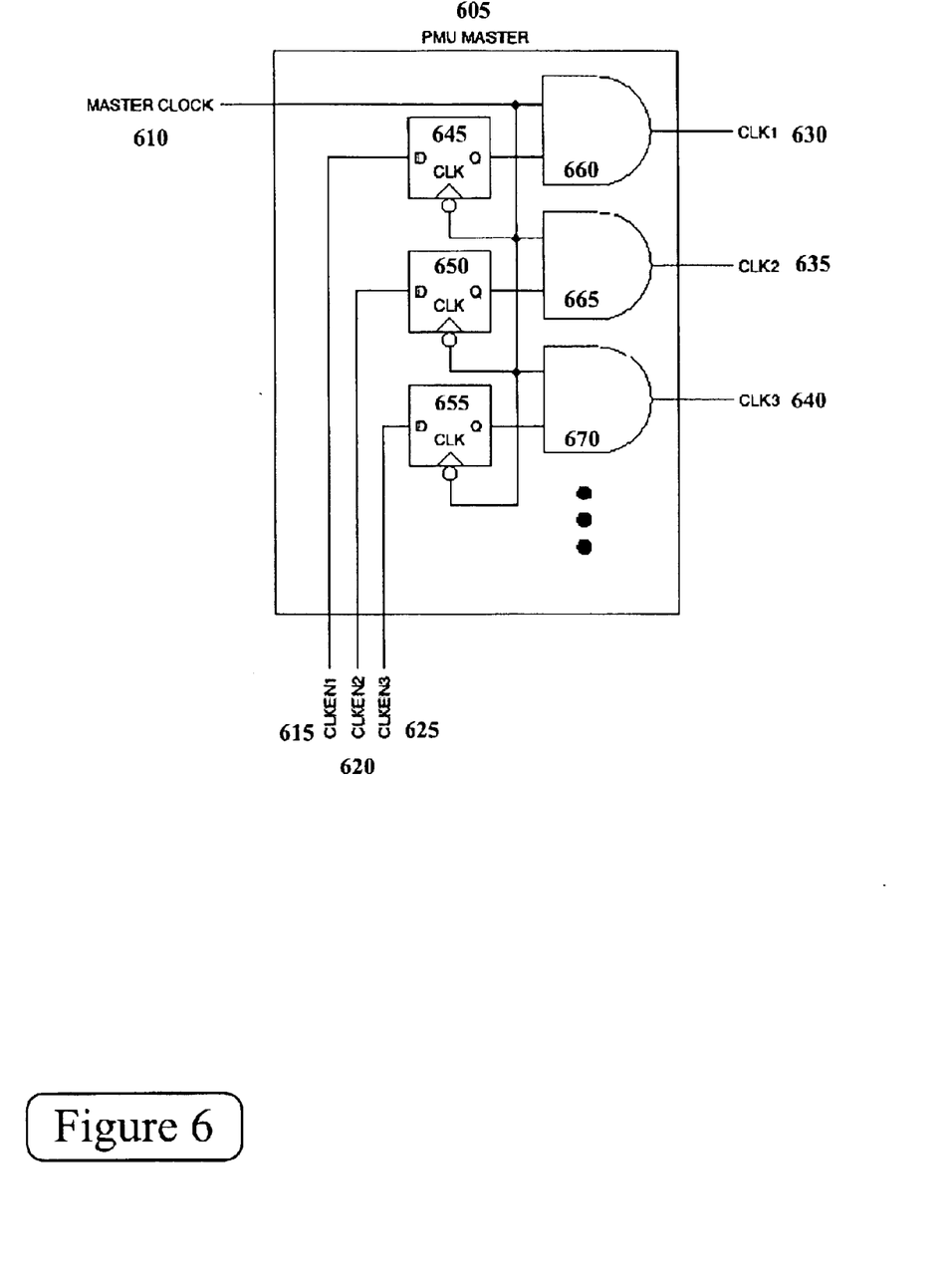
FIG. 6 illustrates an embodiment of a power management unit master.

FIG. 6 illustrates an embodiment of a power management unit master (PMU master). In the illustrated embodiment, the PMU master is shown with three clock signals, but any number of clock signals may be implemented. The PMU master 605 receives a master clock input 610. The master clock is a first input to multiple AND gates, which are shown as a first AND gate 660, a second AND gate 665, and a AND gate 670. The second input to each AND gate will enable the clock signals, shown as CLK1 660, CLK2 665, and CLK3 670. The PMU master 605 has a first enable input 615, a second enable input 620, and a third enable input 625. According to one embodiment, the enable signals could act as the second input of each AND gate. However, if the clock enable signal reaches each AND gate a short time after the rising edge of the master clock, then a clock glitch may occur. If the master clock goes high and then the relevant enable signal is disabled, the result is a clock pulse of short duration that may have consequences in the operation of the associated sub-module.

In order to avoid the clock glitches resulting from an enable signal being deactivated after the master clock goes high, the clock enable signal may be restricted to changing only when the master clock is low. In one embodiment in which a clock enable occurs while the master clock 610 is high, a delay of one-half of a clock cycle can be incorporated to shift the enable signal to a time period when the master clock is low. However, propagation delays in the system would need to be known to a high degree of accuracy to delay the enable signals by an appropriate time period. In another embodiment, as shown in FIG. 6, the second input of first AND gate 660, a second AND gate 665, and a third AND gate 670 are coupled respectively to the output Q of a first D-type flip-flop 645, a second D-type flip-flop 650, and a third D-type flip-flop 655. The input D of each flip-flop is a clock enable signal, shown as CLKEN1 615, CLKEN2 620, and CLKEN3 625. Each flip-flop is then clocked by an inverted master clock signal, thus each is clocked at a falling edge of the master clock signal. By clocking the flip-flops on a falling edge, the flip-flops will only latch the enable signals when the clock goes low. If the propagation delay from a Q output to an AND gate is less than a half-cycle, the enable signals will be provided to the AND gates during the time period when the master clock is low, thereby avoiding the described clock glitch problem.

In one example, an enable signal is received on the first clock enable input 615 of the PMU master 605. The enable signal appears on the D input of the first D-type flip-flop 645. With the inverted clock signal, when a trailing edge of a clock signal is received, the enable signal is latched at the Q output of the first D-type flip-flop 645. Upon receiving a rising edge of a clock signal, the first AND gate 660 has a first high input from the Q output of the first D-type flip-flop 645 and a second high input from the master clock 610, resulting in an active clock at the first clock output 630.

Power Management Process

Figure 7:
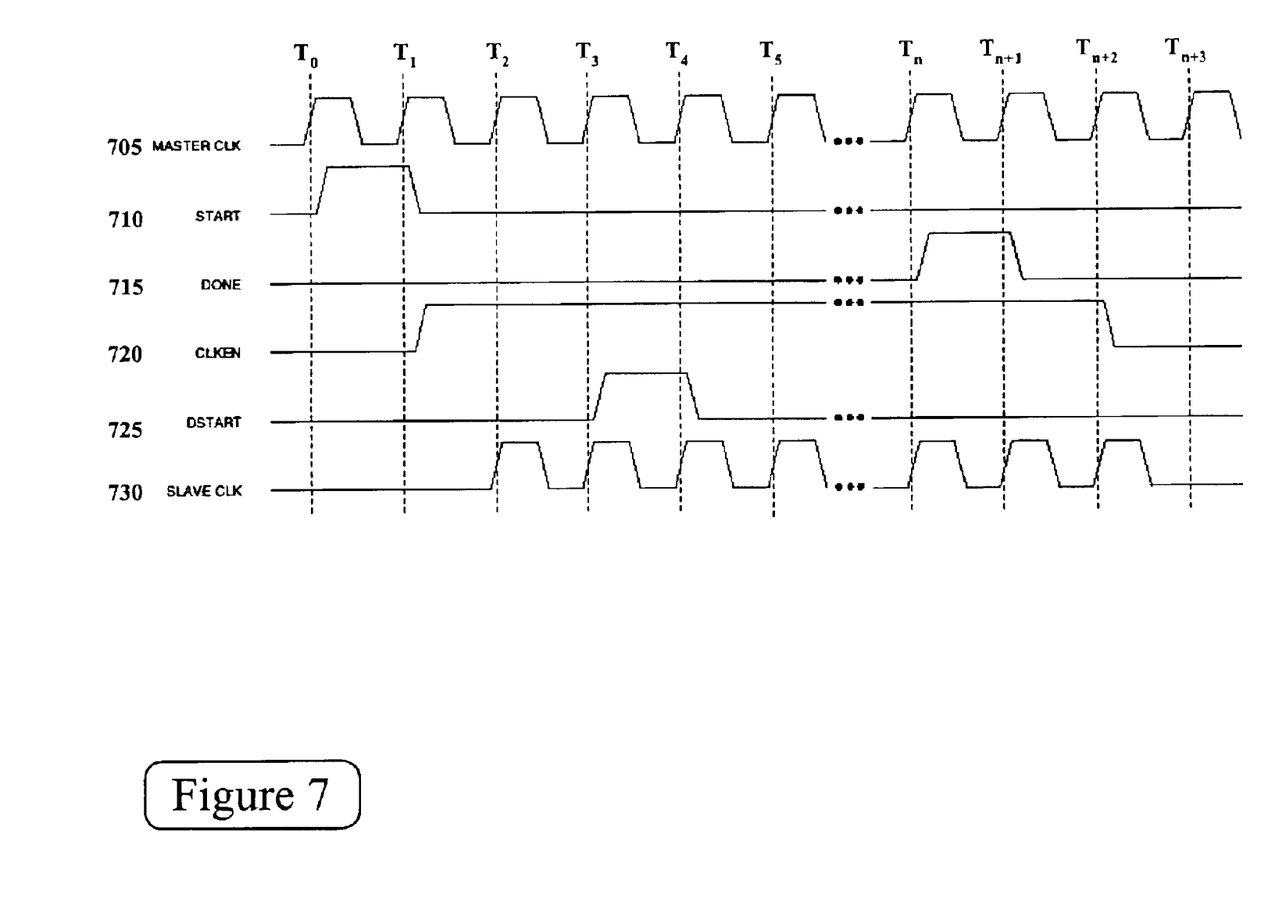
FIG. 7 is a timing diagram for an embodiment of the invention.

FIG. 7 is a timing diagram for a computer operation example according to an embodiment of the invention. In this illustration, a master clock signal 705 is operating at or before time $T_0$. A START signal 710 is sent at time $T_0$, the signal being received by a PMU slave associated with a sub-module. A clock enable signal 720 is enabled the PMU slave unit being at time $T_1$. The slave clock signal 730 for the sub-module is enabled beginning at time $T_2$. With the clock for the sub-module enabled, a delayed start signal 725 is sent by the PMU slave at time $T_3$, which commences operation of the sub-module.

When the sub-module has completed operations, a DONE signal 715 is sent by the sub-module at time $T_n$. After receiving the DONE signal 715, the PMU slave disables the clock enable signal 720 at time $T_{n+2}$, which results in disabling the slave clock signal 730 at time $T_{n+3}$.

Card Architecture

Figure 8:
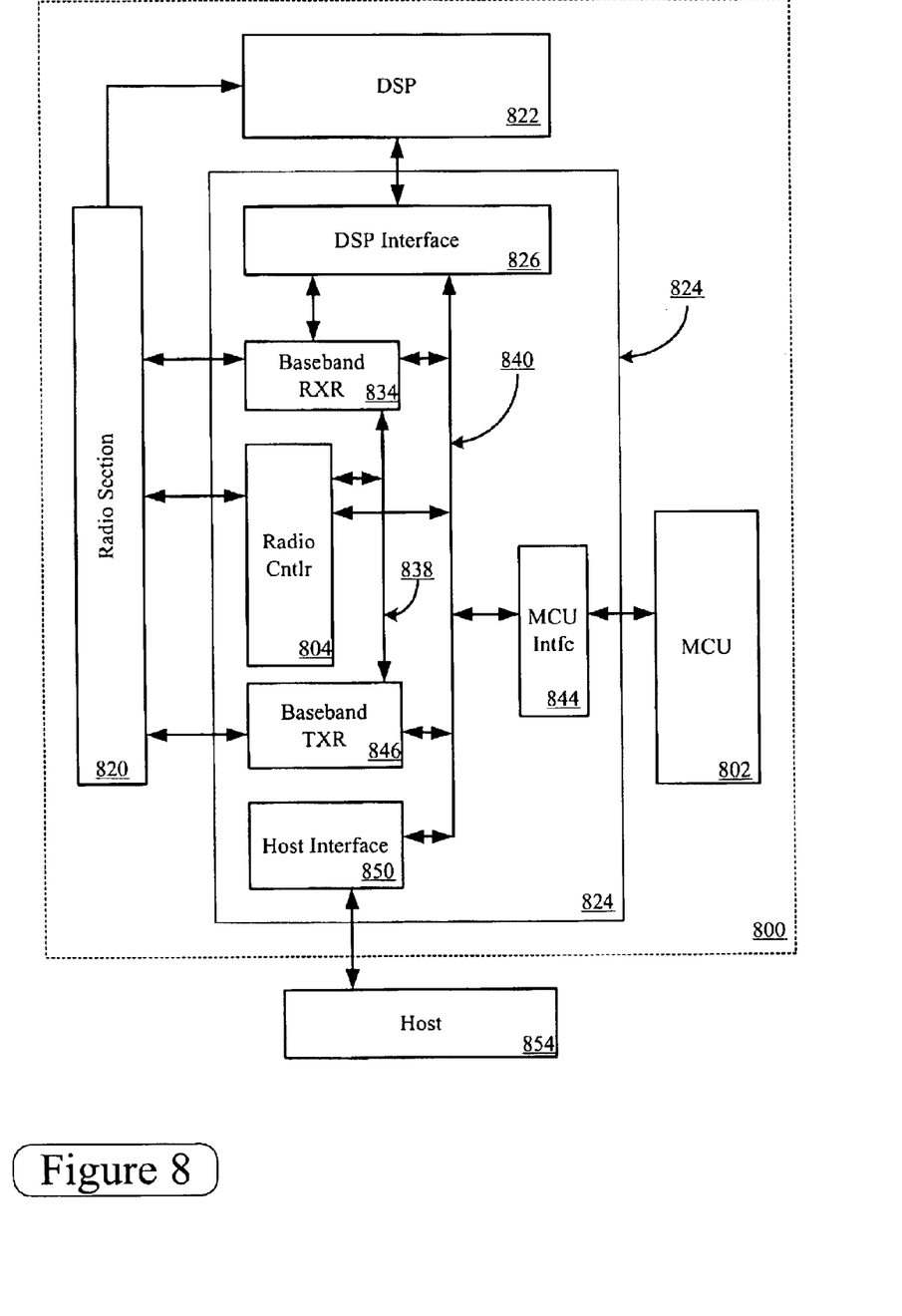
FIG. 8 illustrates a removable device in which an embodiment of the invention may be implemented.

FIG. 8 is a block diagram of a removable device, which may be a computer adapter card 800 such as a PCMCIA (Personal Computer Memory Card International Association) card, SD (Secure Digital) card, MultiMediaCard or USB (Universal Serial Bus) device, in which embodiments of the invention can be implemented. The card 800 is coupled with a host 854 at a port or slot. The host system can be a mobile computer (for example a laptop, notebook, or tablet PC), a desktop computer, a hand-held device (for example palmtops, PDAs, cellular phones, digital cameras), or any other data source or sink including other computers, computer peripherals, and other electronic products.

The card 800 includes a high-layer controller or master control unit (MCU) 802 to perform higher layer processing, such as layer-2, layer-3, and layer-4processing. The MCU 802 is coupled through an MCU interface 844 to a physical layer processor, such as an ASIC (Application Specific Integrated Circuit) 824, to perform lower layer processing, such as layer-0 and layer-1 processing. A radio section 820 is coupled to the ASIC 824 through a baseband receiver 834, a baseband transmitter or digital modulator 834, and a radio controller 804. A DSP (digital signal processor) 822 is coupled to the ASIC 824 through a DSP interface 826 and to the radio section 820 to process data packets received and transmitted through the radio section 820. As one example, on an uplink the MCU 802 can provide layer-2 format data to the ASIC 824 via the MCU interface 844. The ASIC 824 processes the data to generate a modulated transmit signal that is provided to the radio section 820.

The DSP interface 826 is included in the ASIC 824 to interface data, interrupts, and control signals between the DSP 824 and the ASIC 826, the baseband receiver 834, and the baseband transmitter 846. A radio controller line 838 conveys radio control signals within the ASIC 824. An MCU line 840 conveys controls and data from the MCU 802 within the ASIC 824. The radio controller 804 controls the components within the radio section 820. The radio controller 804 contains an instruction execution unit and controls power and timing for components of the radio. The ASIC 824 also includes a PCMCIA or other type of host interface 850 to provide an interface with the PCMCIA port or other port or slot of the host 854.

In the card 800 shown in FIG. 8, the ASIC 824, the radio section 820, and the DSP 822 each reside on separate chips or modules, although this is not required. In an alternate embodiment any one or more, or all, of such items can be combined on a common chip or module. In addition, while the interfaces and most registers described above are shown as residing on the ASIC, any one or more of these interfaces and memories can reside on one of the other chips or on an additional chip. In yet another embodiment of the invention any portion of the MCU, the ASIC, the DSP, or the radio can be integrated with the host system or implemented in software by executing instructions within a processor of the card, the host or an auxiliary system.

General Matters

The present invention can be implemented in an i-BURST™ personal broadband access system. i-BURST™ is a trademark of ArrayComm, Inc. of San Jose, Calif. The i-BURST™ personal broadband access system provides a high-speed, wireless connection, for example to the Internet, for many wireless devices, such as portable computer systems (for example laptops), handheld devices (for example palmtops), digital cameras, game consoles, Internet appliances, etc. The i-BURST™ personal broadband access system provides speeds of more than 1 Mbps per user and up to 40 Mbps at any location, freedom to move, and an always-on connection.

In addition to i-BURST™ systems, embodiments of the present invention can be implemented in, low-mobility cellular and hot spot wireless communications systems. The present invention, while described in the context of i-BURST™ protocols is in no way restricted to using the i-BURST™ air interface or to TDMA systems, but may be utilized as part of any communication receiver, including CDMA systems using the IS-95 or WCDMA air interface, the GSM (Global System Mobile) air interface, the PHS (Personal Handyphone System defined by the Association of Radio Industries and Businesses ARIB, Japan) interface, IEEE 802.11, and WIFI, and also for wireless local loop (WLL) systems.

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by an adapter card of a user terminal. However, many of the steps described as being performed by a user terminal may be performed by a base station and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:

monitoring one or more signals relating to the operation of each of a plurality of sub-modules, the plurality of sub-modules including a first sub-module coupled with a second sub-module, wherein monitoring signals for the second sub-module comprises monitoring a control signal from the first sub-module and monitoring a status signal for the second sub-module; and managing power independently for each sub-module based on the monitored signals, wherein managing power for the second sub-module comprises activating a clock signal for the second sub-module upon receiving the control signal from the first sub-module and deactivating the clock signal for the second sub-module upon receiving the status signal for the second sub-module.

2. The method of claim 1, wherein the clock signal for each sub-module is activated only for the duration of an operation of the sub-module.

3. The method of claim 1, wherein the control signal comprises a signal indicating that the first sub-module has valid data or a signal indicating that the first sub-module has completed an operation.

4. The method of claim 1, wherein the status signal comprises a completion signal from the second sub-module.

5. A power management system comprising:

a plurality of power management units, each power management unit being associated with one of a plurality of sub-modules;

each power management unit to control the operation of a clock signal for the associated sub-module, a first power management unit to provide a signal to activate an associated first sub-module upon receiving a control signal for the first sub-module from a second sub-module and the first power management unit to provide a signal to deactivate the first sub-module upon receiving a status signal from the first sub-module.

6. The power management system of claim 5, wherein each power management unit controls the operation of the clock for the associated sub-module independently from the operation of a clock for any other sub-module.

7. The power management system of claim 5, wherein the clock signal for each sub-module is activated only for the duration of an operation of the sub-module.

8. The power management system of claim 5, wherein the first and second sub-modules are connected in a chain, the second sub-module preceding the first sub-module.

9. The power management system of claim 5, wherein the first and second sub-modules operate sequentially, the second sub-module operating before the first sub-module.

10. The power management system of claim 5, wherein the first and second sub-modules operate at least in part in parallel.

11. The power management system of claim 5, wherein the first and second sub-modules operate partially in parallel as a pipeline.

12. The power management system of claim 5, wherein the control signal comprises an initiation signal for the associated sub-module.

13. The power management system of claim 12, wherein the initiation signal comprises a start signal or an enable signal.

14. The power management system of claim 12, wherein the status signal comprises a completion signal from the associated sub-module.

15. The power management system of claim 5, further comprising a power management unit master coupled with the plurality of power management units.

16. The power management system of claim 15, wherein each of the plurality of power management units can provide a clock enable signal to the power management master unit.

17. The power management system of claim 16, wherein the power management unit master provides a clock signal to a sub-module upon receiving a clock enable signal from the power management unit associated with the sub-module.

18. A power management unit comprising:
a plurality of detectors to detect signals relating to the operation of a sub-module, the detectors including comprise a detector to detect an initiation signal for the sub-module and a detector to detect a completion signal from the sub-module;
an output to provide a signal for activation or deactivation of clocking of the sub-module;
a delay unit to produce a delayed start signal to the sub-module upon receiving an initiation signal for the sub-module; and
an output to provide the delayed start signal to the sub-module.

19. The power management unit of claim 18, wherein the initiation signal comprises a start signal or an enable signal for the sub-module.

20. The power management unit of claim 18, wherein the power management unit operates independently from the operation of a second power management unit that is contained in a system with the power management unit.

21. The power management unit of claim 18, wherein the signal for activation or deactivation of clocking for the sub-module is a clock enable signal.

22. The power management unit of claim 21, wherein the clock enable signal is provided to a power management unit master.

23. The power management unit of claim 22, wherein the power management unit master provides a clock signal to the sub-module upon receiving an active clock enable signal.

24. The power management unit of claim 23, wherein the clock signal for the sub-module is activated only for the duration of an operation of the sub-module.

25. The power management unit of claim 18, wherein the signal for activation or deactivation of clocking for the sub-module is a clock signal provided to the sub-module.

26. A power management system comprising:
a power management unit master; and
a plurality of power management unit slaves, each power management unit slave being coupled with the power management unit master, each power management unit slave being associated with a corresponding sub-module of a plurality of sub-modules, each power management unit slave to provide a clock enable signal to the power management unit master upon receiving a control signal for the associated sub-module and to provide a clock disable signal to the power management unit master upon receiving a status signal from the associated sub-module.

27. The power management system of claim 26, wherein the power management unit master provides a clock signal to a sub-module upon receiving a clock enable signal from the power management slave associated with the sub-module.

28. The power management system of claim 26, wherein each power management unit slave controls the operation of the clock signal for the associated sub-module independently from the operation of a clock signal for any other sub-module of the plurality of sub-modules.

29. The power management system of claim 26, wherein two or more of the plurality of sub-modules are connected in a chain.

30. The power management system of claim 26, wherein two or more of the plurality of sub-modules operate sequentially.

31. The power management system of claim 26, wherein two or more of the plurality of sub-modules operate in parallel.

32. The power management system of claim 26, wherein two or more of the plurality of sub-modules operate partially in parallel as a pipeline.

33. The power management system of claim 26, wherein the control signal comprises an initiation signal for the associated sub-module.

34. The power management system of claim 33, wherein the initiation signal comprises a start signal or an enable signal for the associated sub-module.

35. The power management system of claim 26, wherein a status signal comprises a completion signal from the sub-module.

36. An interchangeable computer adapter card comprising:
a master control unit to control operations performed on the card;
a physical layer processor; and
a radio section to transmit and receive radio signals to and from the card, the radio section comprising a power management system, the power management system comprising:
a plurality of power management units, each power management unit being associated with one of a plurality of sub-modules;
each power management unit to control the operation of a clock signal for the associated sub-module, a first power management unit to provide a signal to activate an associated first sub-module upon receiving a control signal for the sub-module from a second sub-module and the first cower management unit to provide a signal to deactivate the first sub-module upon receiving a status signal from the first sub-module.

37. The adapter card of claim 36, wherein each power management unit controls the operation of the clock for the associated sub-module independently from the operation of a clock for any other sub-module.

38. The adapter card of claim 36, wherein the clock signal for each sub-module is activated only for the duration of an operation of the sub-module.

39. The adapter card of claim 36, wherein the first and second sub-modules are connected in a chain, the second sub-module preceding the first sub-module.

40. The adapter card of claim 36, wherein the first and second sub-modules operate sequentially, the second sub-module operating before the first sub-module.

41. The adapter card of claim 36, wherein the first and second sub-modules operate at least in part in parallel.

42. The adapter card of claim 36, wherein the first and second sub-modules operate partially in parallel as a pipeline.

43. The adapter card of claim 36, wherein the control signal comprises an initiation signal for the associated sub-module.

44. The adapter card of claim 43, wherein the initiation signal comprises a start signal or an enable signal.

45. The adapter card of claim 36, wherein the status signal comprises a completion signal from the associated sub-module.

46. The adapter card of claim 36, wherein the power management system further comprises a power management unit master.

47. The adapter card of claim 46, wherein each of the plurality of power management units can provide a clock enable signal to the power management master unit.

48. The adapter card of claim 47, wherein the power management unit master provides a clock signal to a sub-module upon receiving a clock enable signal from the power management unit associated with the sub-module.

* * * * *